United States Patent [19]

Glucksman

[11] Patent Number: 5,131,932

[45] Date of Patent: Jul. 21, 1992

[54] FILTER REPLACEMENT INDICATOR

[75] Inventor: Dov Z. Glucksman, Topsfield, Mass.

[73] Assignee: Bionaire, Inc., Lachine, Canada

[21] Appl. No.: 580,954

[22] Filed: Sep. 11, 1990

[51] Int. Cl.$^5$ ..................... B01D 27/08; B01D 29/07
[52] U.S. Cl. ........................................ 55/274; 55/471;
55/472
[58] Field of Search ................ 55/270, 274, 283, 316,
55/471, 472, 473; 73/713, 714

[56] References Cited

U.S. PATENT DOCUMENTS

| | | | |
|---|---|---|---|
| 2,700,362 | 1/1955 | Calling | 55/274 X |
| 2,707,879 | 5/1955 | Dwyer | 55/274 X |
| 3,024,655 | 3/1962 | Dwyer et al. | 55/274 X |
| 3,071,914 | 1/1963 | Gesmar | 55/274 |
| 3,172,746 | 3/1965 | Shuck | 55/274 |
| 3,201,772 | 8/1965 | Ladusaw | 55/274 X |
| 3,934,543 | 1/1976 | Howard | 55/274 X |
| 4,014,209 | 3/1977 | Emerick | 55/274 X |
| 4,121,916 | 10/1978 | Fricke | 55/316 |
| 4,236,902 | 12/1980 | Fricke | 55/316 X |
| 4,629,479 | 12/1986 | Cantoni | 55/274 |
| 4,787,922 | 11/1988 | Kulitz | 55/316 X |

Primary Examiner—Robert Spitzer
Attorney, Agent, or Firm—Charles R. Miranda

[57] ABSTRACT

An indicator for indicating values of a variable condition being measured, as for example in a portable air cleaner having replaceable filters subjected to particulates in the air. The indicator is provided with an indicia scale marked off in uniformally spaced graduations with shading between the graduations being non-uniform and proportional to the condition being measured.

8 Claims, 6 Drawing Sheets

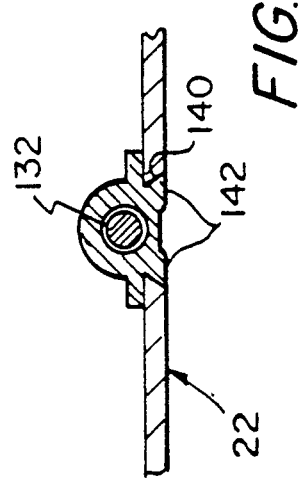
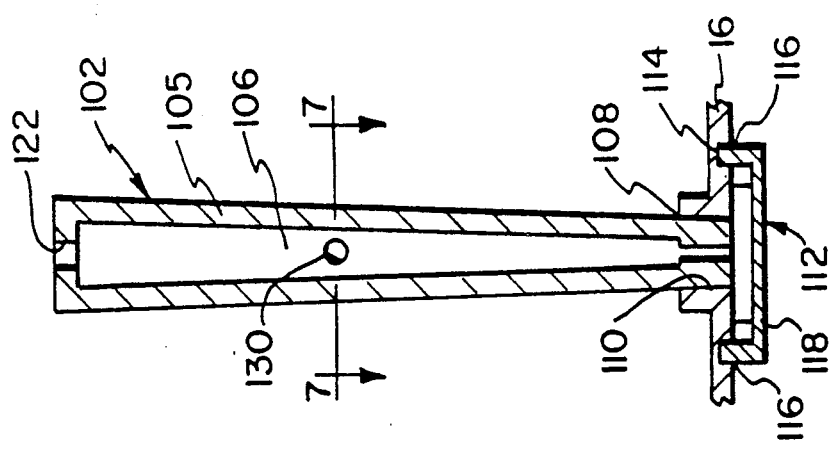

FILTER REPLACEMENT INDICATOR

BACKGROUND OF THE INVENTION

The present invention relates to air cleaners and more particularly to portable air cleaners which employ permeable replacement filters through which air is passed for trapping and removing particulates from the air stream.

In air cleaners of the class described, the filters are generally in sheet-like form with fibrous material or tiny pellets presenting extremely small tortuous passageways or openings for the flow of air through the filters. In passing through the filters, particulates in the air are trapped within the filters and the treated air minus the particulates is discharged from the air cleaning device. In operation, a buildup of particulates on the filters occurs and in due course the filters become increasingly clogged, reducing the amount of particulates per unit volume of air being removed from the air stream passing through the filters. Generally, a motor driven fan is utilized to draw the air through the filters and as the filters become more clogged, the pressure of the air downstream of the filters becomes less so that a differential pressure exists across the filters which gradually becomes greater as the permeability of the filters is reduced. Eventually, the effectiveness of the filters in reducing particulates becomes minimal and the clogged filters must be replaced, to return the air cleaner to an efficient operating condition.

In present portable air cleaners, the air cleaners may be operated by users long past the time when the filters should be replaced because the filters have substantially lost their effectiveness in treating the air. One of the reasons for lack of action by the user is that in these appliances the change in flow of air discharged from the housing, when the filters are clogged, is not appreciably different from the air flow when the filter is not clogged or partly clogged. Because the user is unable to sense the difference in air flow the filters become so clogged as to render them ineffective for the purposes for what they are intended. There are many users of these appliances also that forget, or even perhaps, do not know that the filters should be replaced. As a result, one of the principal purposes of the appliance is defeated because the user is not alerted to the replacement need. If the condition continues, the user may feel that the air cleaner is improperly operating and be tempted to set it aside and not use the appliance. Or, it may become a cause of complaint to the manufacturer who may have to expend needless time and expense to satisfy the customer—user.

SUMMARY OF THE INVENTION

It is an object of the present invention to provide a novel indicating needs for air cleaner appliances to inform and alert users when the air filters therein require replacement.

Another object is to provide a novel indicating means for air cleaners which relates the condition of permeability of the filter therein to the pressure drop of the air flow across the filters, thereby alerting a user to the need for replacement of the filters.

Still another object is to provide a novel indicating means for air cleaner appliances with replaceable filters, and which embody a flow meter to detect the pressure of the air flow downstream of the filters, to effect indications of permeability of the filters.

A still further object is to provide a novel indicating means for appliances in which a variable orifice flow meter has an inlet communicating with the outside of the appliance and an outlet in communication with the pressure downstream of the filters thereby creating an air flow through the flow meter, the velocity of which varies in accordance with the pressure drop differential across the filter, to thereby effect indications of permeability of the filters.

Still another object is to provide a novel indicator having an indicator with graduations, and spaces between graduations shaded in varying amounts to provide a quick visual access to the conditions represented by the indicia.

A still further objective is to provide a novel flow indicating means for indicating the permeability of replacement filters in an air cleaner appliance which is inexpensive, compact, simple, and easy to operate and use.

The present invention contemplates an air cleaner appliance or device which has a housing provided with a first compartment or chamber and a second compartment or chamber. The first chamber has an inlet through which a gaseous medium, such as air, is to be treated by filter means which traps and removes particulates from the air. The first chamber has an outlet through which the treated air passes after it leaves the filter and communicates with the inlet of the second chamber which has an outlet for discharging treated air from the air cleaner. A motor driven fan is provided in the second chamber to cause flow of air through the air cleaner. As the particulates trapped by the filter buildup the pressure drop across the filter increases and the flow of air through the filter is proportionately reduced. As the build-up becomes greater, the pressure within the second chamber becomes less. A variable orifice flow meter is provided in the housing and has an inlet communicating with the exterior of the air cleaner housing and an outlet in communication with the second chamber. Since the pressure in the second chamber becomes progressively less as the permeability of the filter is reduced, an increasing larger pressure drop occurs across the flow meter causing correspondingly increasing rates of flow of air from the flow meter inlet through the flow meter outlet. Since the pressure drop across the flow meter has a corresponding relationship to the pressure drop across the filter, the rate of flow or velocity of air through the flow meter will be proportionate to the permeability of the filter. A flow responsive member such as a floating sphere is provided in the path of flow of air flow through the flow meter and is displaced therein to different discrete positions, depending upon the velocity of the air stream. An indicator, having indicia is provided in juxtaposition with the flow meter and the floating sphere, and conditions of permeability of the filter may be determined by the position of the floating sphere in relation to the indicia of the indicator. Shaded areas, of varying dimensions or amounts, are provided as part of the indicia to give quick visual assessment of the permeability of the filter.

BRIEF DESCRIPTION OF THE DRAWINGS

These and other objects and features of the invention will become apparent with reference to the following specification and to the drawings and wherein like reference characters refer to like parts in the several views:

FIG. 6 is a vertical cross section through a flow meter comprising the present invention;

FIG. 7 is a sectional view taken along the line 7—7 of FIG. 6; and,

DETAILED DESCRIPTION

Figure 1:
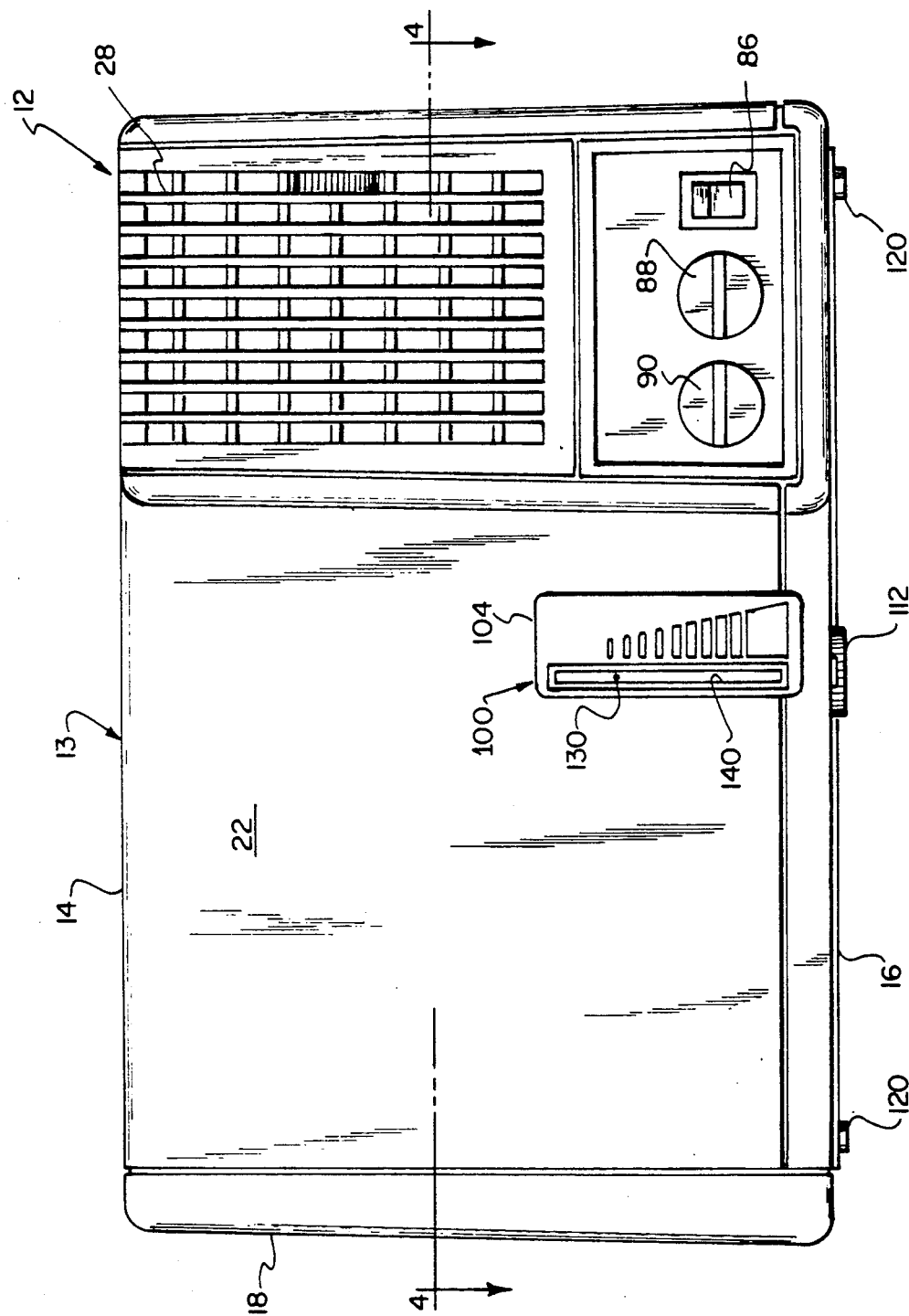
FIG. 1 is a front elevational view of the air cleaner embodying the flow indicating means of the present invention.

Referring now to the drawings for a more detailed description of the present invention and more particularly to FIG. 1 thereof, an air cleaner in which the novel flow indicator means is employed is generally designated by the numeral 12.

Air cleaner 12 has a housing 13 which includes a top 14, a bottom 16, sidewalls 18 and 20, respectively, and front and rear walls 22 and 24, respectively.

Figure 2:
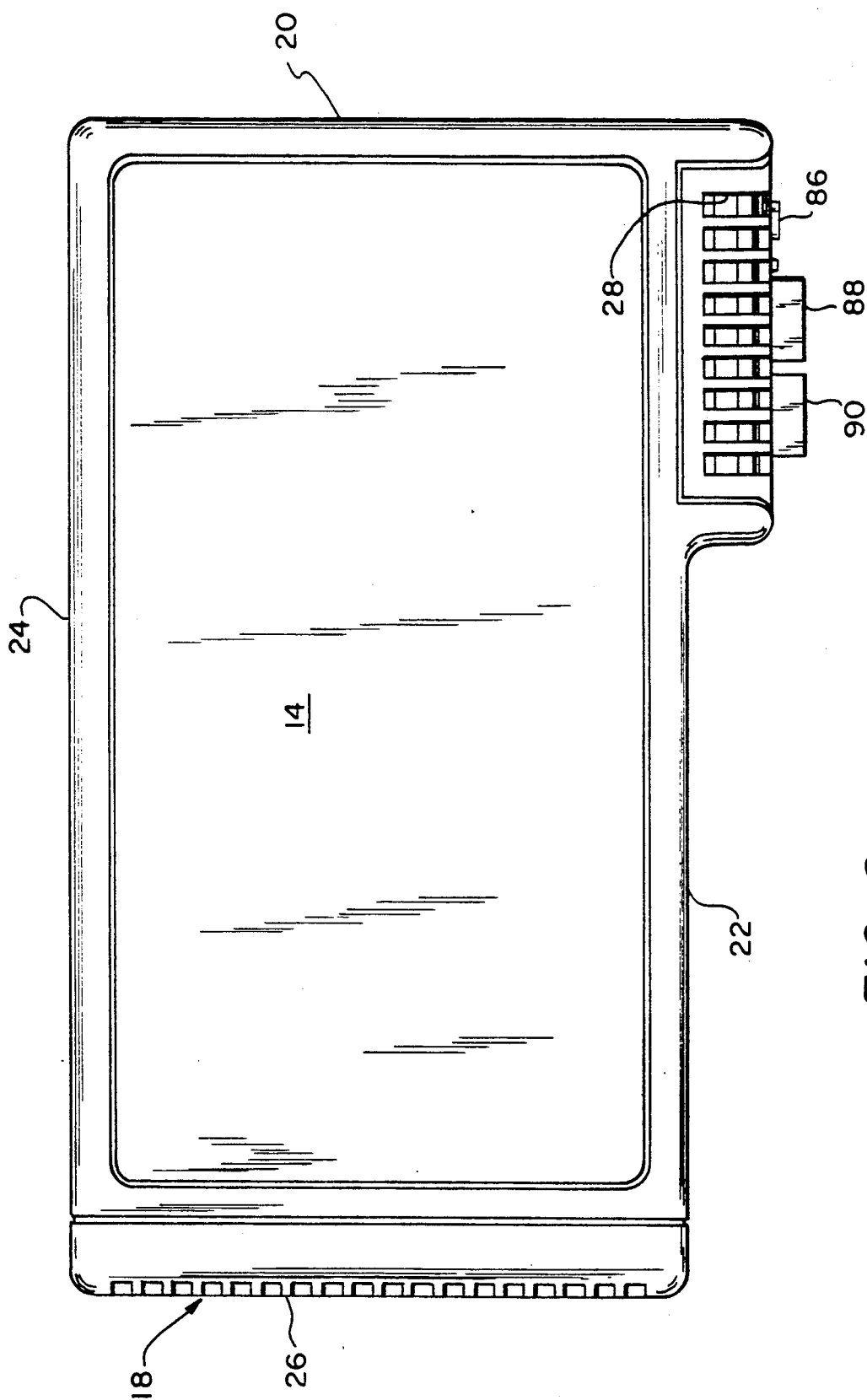
FIG. 2 is a top plan view of the air cleaner of FIG. 1.
Figure 3:
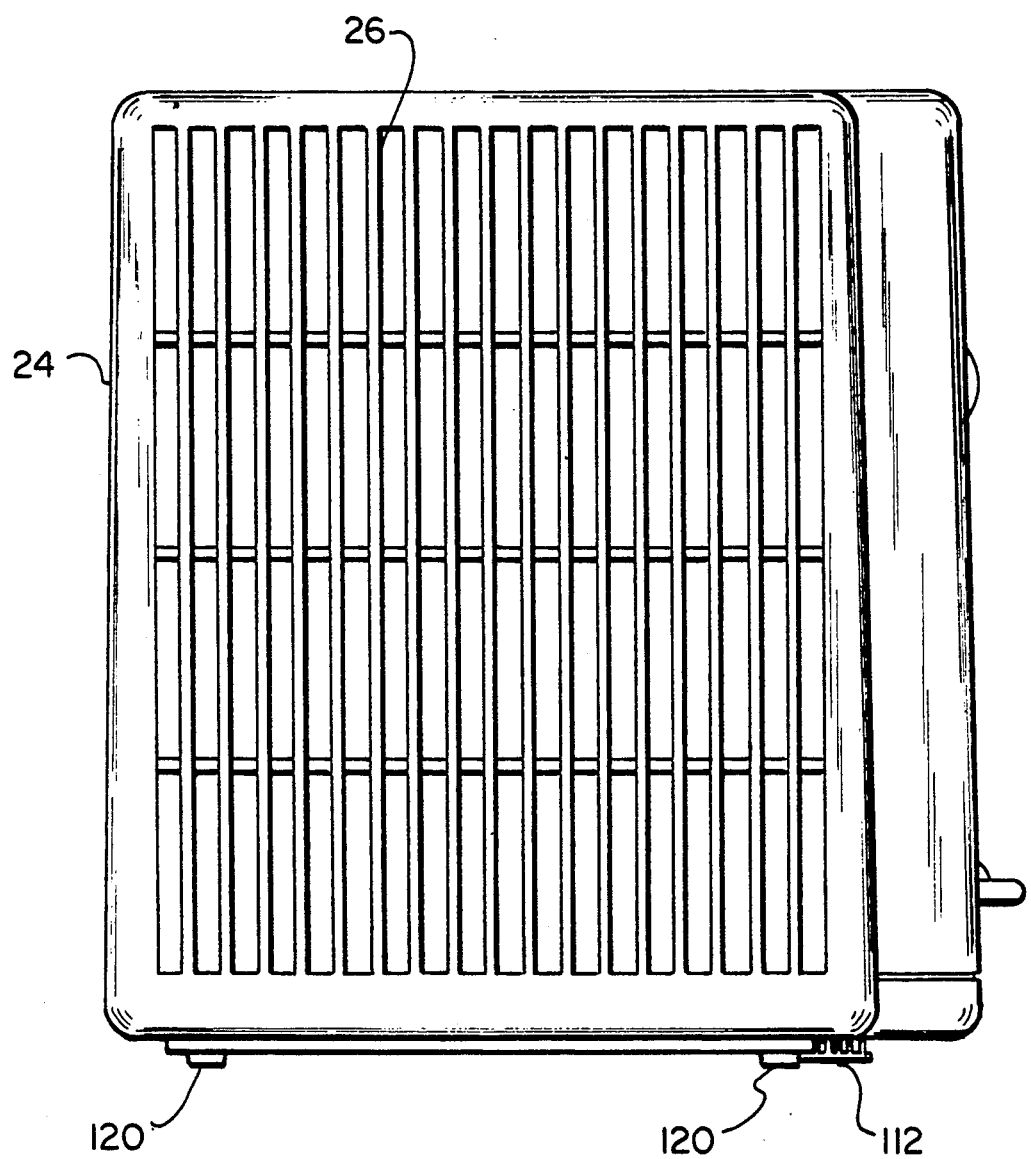
FIG. 3 is a side elevational view of the air cleaner of FIG. 1, as viewed from left of FIG. 1, and showing in particular the inlet grille.

An inlet grille 26 (see FIGS. 2, 3, and 4,) is provided in sidewalls 18 for permitting entry of air from outside of the housing 13, and an outlet grille 28 is provided in front wall 22 to provide for discharge of air from housing 13.

Housing 13 is separated into two compartments or chambers 30 and 32 (see FIG. 4) by a perforated wall 34 which is tightly fitted between front and rear walls 22 and 24 in order to constrain flow of air through the wall 34 and not along the perimeter of the wall. Sidewall 18 is separable from housing 13 and a pair of vertically extending projecting portions 36 (FIG. 4) are disposed for sliding movement in tracks 38 formed in front and rear walls 22 and 24. As may be visualized from FIG. 4, sidewall 18 when moved upwardly permits the insertion and withdrawal of a filter, generally designated by the numeral 40.

Figure 4:
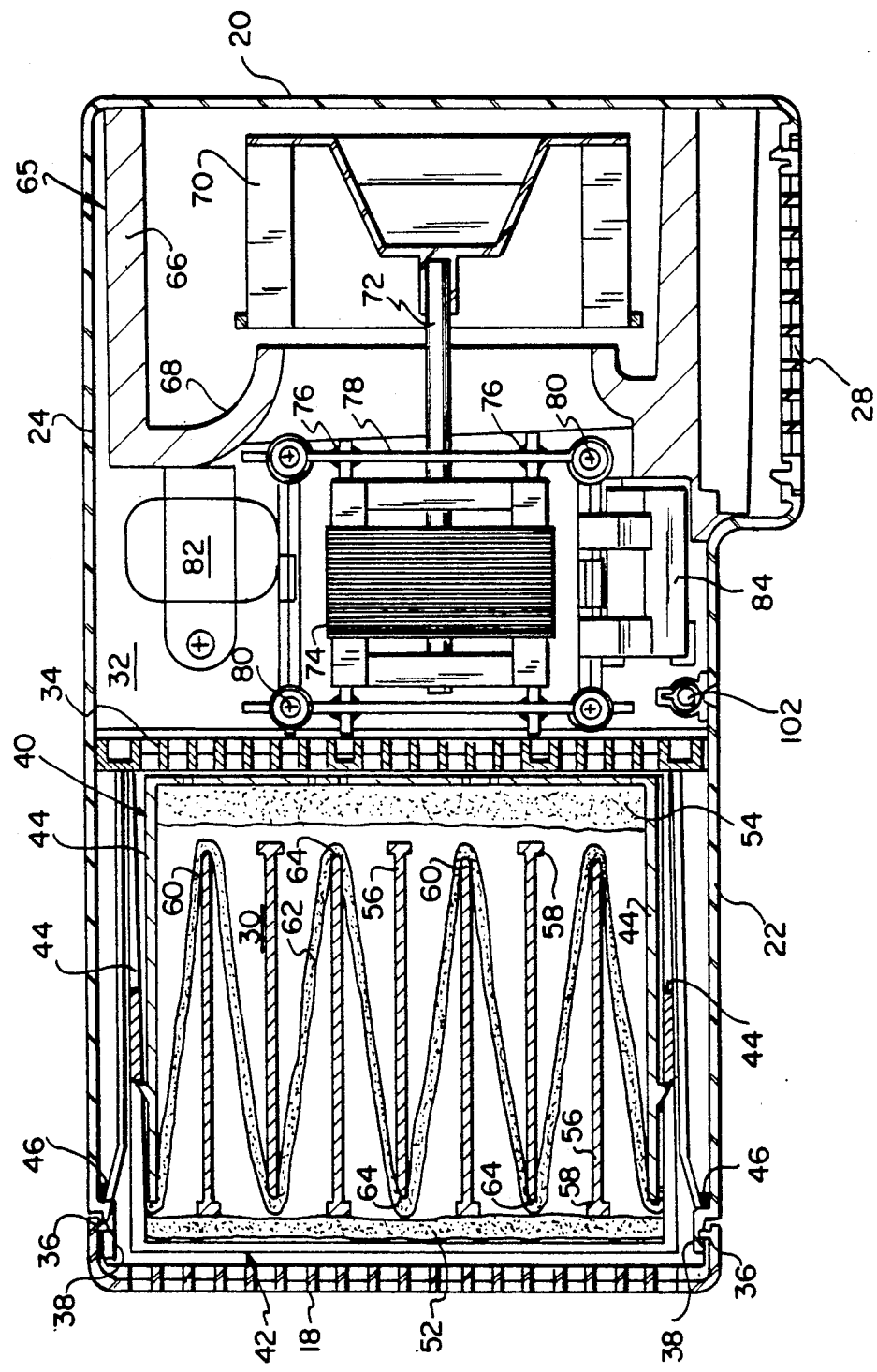
FIG. 4 is a section taken along line 4—4 of FIG. 1.

Filter 40 comprises a box-like rigid frame 42 which has walls 44 tightly fitted to projecting inner wall portions 46 of housing 13. A sheet-like porous prefilter 52 of a conventional filter medium is provided adjacent to sidewall 18 and a charcoal filter 54 is disposed adjacent perforated wall 34. A plurality of parallel and spaced upstanding walls 56 are shown in section in FIG. 4 and arranged in the space between filters 52 and 54. Walls 56 are each provided along one side thereof with a T-shaped section 58 and at the other side with a straight edge 60. As seen in FIG. 4, the walls 56 are so arranged that the edges 58 and 60 are disposed in an alternate manner with respect to the adjacent filters 52 and 54. An accordion-like filter 62 is creased and folded over and along the edges 58 and 60, whereby the filter 62 along its length engages the edges 60 and is spaced from the edges 58. Ends 64 are secured within the walls 44 of frame 42.

A conventional centrifugal blower, generally designated by the numeral 65, is located in compartment or chamber 32 and includes a blower housing 66 with an inlet funnel 68 and an outlet (not shown) which is in alignment with outlet grille 28. A blower impeller 70 is disposed in housing 66 and is carried for rotation by an outlet shaft 72 of an electric motor 74, shown somewhat diagrammatically in FIG. 4. Motor 74 is supported by four rubber shock absorbing grommets 76, carried by a cradle 78 which is mounted to bottom 16 of housing 13 by screws 80. Disposed within chamber 32 is a transformer 82 (schematically shown) and a high voltage generator 84 (as schematically shown) powered by transformer 82 to generate negative ions for emission into the air stream exiting housing 13 through outlet grille 28. An on-off push switch 86 (FIG. 1) is connected in circuit (not shown), with a power supply (not shown). A motor-speed control switch 88 is arranged in juxtaposition with on-off switch 86 on the front wall 22, and through a circuit not shown effects a variable energization of motor 74 to vary the speed of rotation of impeller 70. An ionizer rotary switch 90, in a similar fashion, is connected in circuit by means (not shown) to variably control power to generator 84.

In the operation of the structure described so far, a user desiring to remove particulates from the air in the room in which the air cleaner has been placed, first actuates the on-off push switch 86 to an "on" position Switch 88 is then rotated from the position shown in FIG. 1 to effect the rotation of the impeller 70 to a desired speed to thereby induce a certain flow of air into the air cleaner 13 through inlet grille 26, through filter 40 and into chamber 32, and then out of the housing through outlet grille 28. If desired, the user could effect the introduction of negative ions in the air stream flowing through chambers 32. It maybe readily understood that with increasing volumes of air passing through the filter 40, the amount of particulates trapped and removed from the air treated by the air cleaner 13 likewise correspondingly increases to partially fill the tiny passages and openings in the filter and reduce the permeability of the filter. In due time, the buildup of particulates on the filter become so great as to substantially clog the openings in the filter to reduce, to a significant degree, its permeability and thereby greatly reduce the effectiveness of the filter. If the condition were permitted to continue to a point where the permeability of the filter is reduced to an extremely low value, then for all intents and purposes, the function of the air cleaner in removing particulates from the air stream ceases. Concomitant with the changes in permeability of the filter 40 taking place, a change in differential pressure of the air stream across the filter, occurs. In general terms, as the particulates buildup on the filter, a change in differential pressure takes place and a proportionate change in air flow through the filter occurs.

Figure 5:
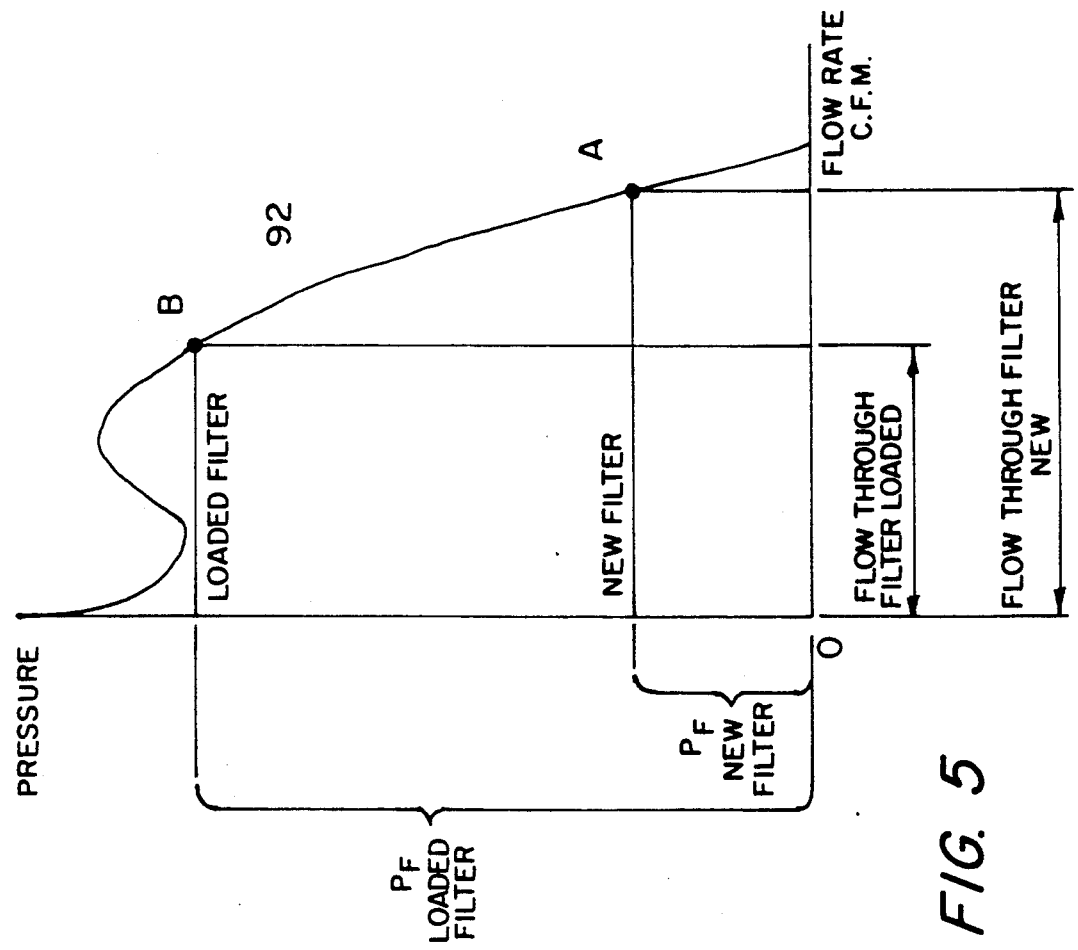
FIG. 5 is a typical flow-pressure characteristic of a blower as used in a portable air cleaning appliance.

The graph in FIG. 5 well illustrates the phenonemen occurring in the relationship between the differential pressure across the filter and the flow rate of the air through the filter. The abscissa or X axis represents the flow rate of air through the filter and the ordinate or Y axis represents the pressure of the air in inches of water. As may be seen from the curve 92 which plots the coordinates of pressure and air flow, the differential pressure across the filter is lowest and the air flow the highest when a new filter is used. Curve 92 shows that as the differential pressure increases, as a result of buildup of particulates on the filter, the air flow rate or velocity correspondingly is reduced from a point "A" on curve 92 to a point "B" where the filter is loaded and the differential pressure is the highest. It will be noted that the relationship between the differential pressure and the velocity of air flow is a non-linear function so that for example the flow of the velocity of the air is non linear with respect to linear changes in differential pressure.

From a user point of view, even if the user were aware of the fact that the filter 40 requires replacement from time to time because of the possibility of clogged filters, the structure just described does not alert the user to the need to replace the filter. As a result, the usefulness of the air cleaner is diminished or reduced to that degree and may defeat the original purpose for which the air cleaner may have been purchased.

Figure 8:
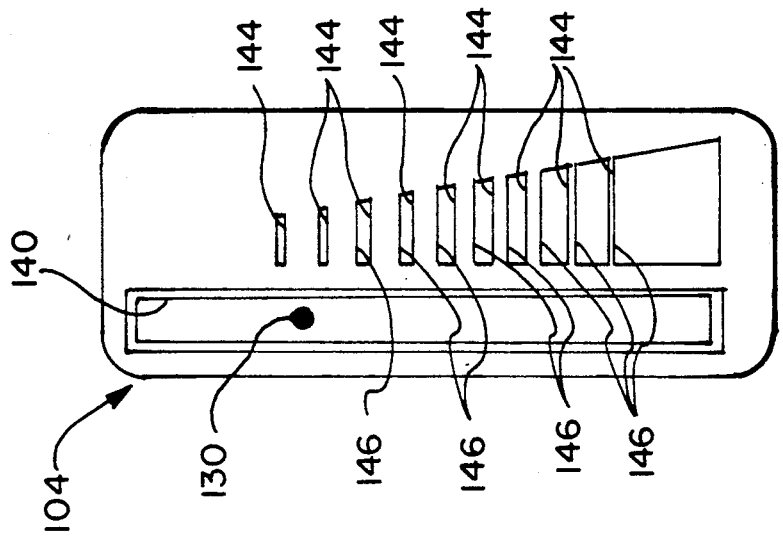
FIG. 8 is an enlarged view of the indicia bearing portion shown in FIG. 1.
Figure 8:
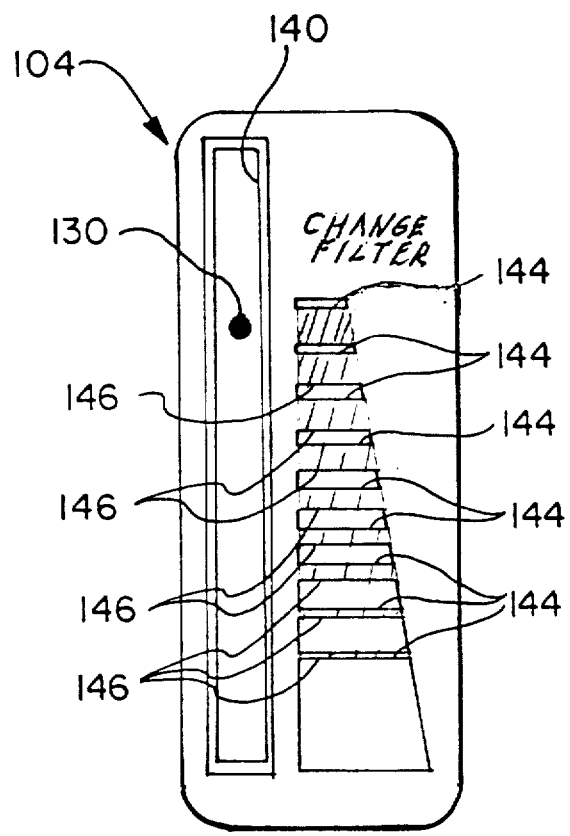

It is a primary purpose of the invention to alert the user to the need to replace the filter in the air cleaner at the appropriate times. To this end, a flow indicating means 100 is provided which includes a flow meter 102 (see FIGS. 4, 6, and 7) and an indicia bearing portion or label 104 (FIGS. 1 and 8). Flow meter 102 comprises an elongated substantially cylindrical shaped housing 105 having a flow passageway 106 which is vertically disposed in chamber 32 (FIG. 4). As better seen in FIG. 6, passageway 106 of housing 105 is provided with an inlet 108 which is press fitted within an opening 110 formed in bottom 16 of housing 13 and a circular perforated cap 112 provided with arcuate shaped fingers which extend into a recess 114 formed around opening 110 to seat the cap therein. The cap 112 is provided with spaced upstanding teeth 116. The tops of teeth 116, engage the bottom 16, whereby the head 118 of cap 112 is spaced from inlet 108 to permit communication exterior of the housing 13 with inlet 108. Feet 120 (FIGS. 1 and 3) are provided at each corner of housing 13 and extend therefrom so that when housing 13 is placed on a flat surface (not shown) the head 118 of cap 112 will be spaced from a flat surface. The upper portion of flow meter housing 105 and passageway 106 is provided with an outlet opening 122 (FIG. 6) which is in communication with the interior of chamber 32 of housing 13. Passageway 106 is tapered in a longitudinal direction and has a varying transverse cross-sectional area which gradually increases in a direction going from the inlet 108 to the outlet 122.

An indicator float, in the form of a sphere or ball 130 (FIG. 6) is unrestrainedly disposed in passageway 106 for movement therein. As may be seen in FIGS. 6 and 7, the space between the float 130 and the wall of passageway 106 defines an orifice area 132 in transverse cross-section, and as the float moves in the passageway the orifice area 132 will either increase or decrease depending upon the direction in which the float moves. The draft or flow of air through the passageway 106 is so slight that the ball 130 maintains its centralized or equi-distant position with respect to the wall of the passageway.

The operation of flow meter 102 as contemplated by the present invention, is to provide a means for detecting the changes in differential pressure across filter 40 in order to utilize such detected changes as a measure of the permeability of the filter 40. With the inlet 108 in communication with the exterior of air cleaner housing 13, the pressure at such point is substantially the same as at inlet grille 26. On the other hand, outlet 122 of flow meter 102 being exposed to the interior of chamber 32 is subjected to the pressure of the air flow therein and downstream of filter 40. In effect, then, the differential pressure across the filter corresponds to that across flow meter 102. It is obvious that as impeller 70 of blower 64 draws air through filter 40 and into chamber 32 for discharge through outlet grille 28, the pressure at flow meter outlet 122 is less than that of flow meter inlet 106, which is at atmospheric pressure, so that a flow of air commences through passageway 106 from inlet 108 to outlet 122. Since float 130 is in the path of the flowing air through flow meter 102, the forces exerted by the air stream against float 130 will tend to move it upwardly in passageway 106 to discrete positions therein, depending on the flow rate or velocity of the airstream. The precise position of the float within passageway 106 is determined by several forces acting on the flow which are: (A) the weight of the float, (B) the velocity pressure of the flowing air in through passageway 106 multiplied by the area of the float, (C) the buoyancy of the float (weight of air volume displaced by the float); the viscous aerodynamic drag of air on the float. It is apparent that the weight of float 130 acts downwardly while the velocity pressure of the air, the buoyancy and the drag all act upwardly.

The velocity pressure of the air is the more significant of the other forces and in the aggregate, the forces exerted on the float vary non-linearly with linear changes in the differential pressure across flow meter 102. For example, the flow rate through the flow meter 102 may be represented by the following formula:

$$FR = "C \times (P_T)^{\frac{1}{2}}$$

Where
- $FR$ = flow rate of air through the flow meter
- $C$ = constant relating to the size of flow meter inlet and outlet opening and to the density of the air
- $P_t$ = differential pressure between the flow meter inlet and the outlet.

It will be understood from the foregoing that the forces acting to displaced float 130 are a function of the differential pressure across the flow meter inlet 108 and outlet 122, which differential pressure itself corresponds to or at least, is a function of the differential pressure across filter 40. Consequently, the position of float 130 in passageway 106 may be taken as a determinant of the permeability of the filter 40.

It is highly desirable, for a number of reasons, to provide indicia in conjunction with measuring devices which are marked off in a uniform linear manner. Accordingly, the present invention operates to render the changes in forces exerted by the changes in flow velocity of the air on the float as a result of linear changes in the differential pressure drop, from non-linear to linear. This is accomplished by calibrating the taper of passageway 106 in such a manner, with respect to float 130, to provide a gradually changing orifice area 132 to permit a greater flow of air through the orifice area, thereby maintaining a linear increase in forces acting on the float with increasing pressure drops across inlet 108 and outlet 122.

The flow meter housing 105 is made of a clear and transparent material, such as any conventional transparent plastic, to render the float 130 visible from the exterior of housing 105. Front wall 22 is provided with a window or opening 140 (see FIG. 7) to accommodate flow meter housing 105 which is secured to the front wall by longitudinally extending ribs 142. Referring now to FIGS. 1 and 8, the label or indicia bearing portion 104 is shown in juxtaposition with the window 140 and the flow meter 102 with its visible float 130. Label 104 has a plurality of uniformly spaced graduations 144 which extend from the lower to the upper portion of the label, where a legend "Change Filter" appears. The spaces between the graduations 144 are filled with shaded areas 146 (see particularly FIG. 8) and in the embodiment shown in the drawings, the shaded areas progressively increase in dimensions from the lowest graduation to the uppermost graduations. Graduations 144 and the shaded areas 146 are embraced within a triangle which is substantially a right angle triangle having its apex cutoff. The visual effect provided by the shaded areas and triangular arrangement, when viewed in conjunction with float 130, provides the user with a quick assessment of the condition of permeability of the filter 40 and an advance indication of when the filter 40 needs to be changed or replaced.

In operation, the user operates air cleaner 12 by actuating the on/off switch 86 to an "on" position and speed control switch 88 is rotated to operate motor 74 to cause a flow of air through air cleaner 12. Air to be treated enters housing 13 through inlet grille 26, passes through filter 40 into second chamber 32 where it is discharged through outlet grille 28 as treated air. The air, passing through filter 40, has particulates removed therefrom which lodge in or on the filter and by reason of the progressive buildup of material on the filter a reduction in permeability of the filter occurs. There is a corresponding increase in the differential pressure across the filter 40 with a concomitant change in the flow of air through the filter. As a result, the pressure within chamber 32 progressively decreases to "suck in" or draw in, a greater flow of air through flow meter 105. This, in turn, moves or displaces the float 130 upwardly in flow passageway 106 to discrete positions therein as a function of the differential pressure across the flow meter inlet 108 and outlet 120. The user, by reading the indicia in conjunction with the float 130 in transparent housing 105 obtains a quick visual impression or indication of the condition of permeability of filter 40. When float 130 reaches the upper-most graduation having the legend "Change Filter" the user is alerted to the fact that the filter needs to be replaced with a new filter. This is accomplished by sliding sidewall 18 upwardly in order to remove filter frame 42 in which the filters 52, 54 and 62 are disposed. A new or unclogged filter frame 42 is then inserted into chamber 30, and wall 18 moved downwardly so that operation of the cleaner may recommence.

From the foregoing, it may be readily apparent that the present invention provides a novel, inexpensive, compact indicator for portable air cleaners to alert users to the need to change and replace the filters therein. The indicator provides for a simple flow meter which in effect detects differential pressure across the filter to thereby displace a flow responsive member, such as a float, in response to such changes, and when viewed in cooperation with an indicia bearing label provides a quick assessment of the conditions of permeability of the filter and the need to replace same. The present invention further embodies an inexpensive indicia bearing label which is able to utilize uniformly spaced graduations with non-linear changes of the flow rate of air through the filter with linear changes in the differential pressure across the filter. The use of the present invention will help serve to provide users of air cleaners with the means to maintain a high efficiency of operation of filter in trapping and removing particulates from the air to be treated.

It also is apparent to those skilled in the art that the present invention is not restricted to air cleaner appliances, but may be used in any equipment in which a gaseous medium has particulates removed by filter means, and replacement of the filters is required from time to time as the effectiveness of the filter becomes minimal due to decreasing permeability.

Although the invention has been described in connection with one embodiment, it is to be understood that variations and modifications maybe resorted to, as will be apparent to those skilled in the art. Such variations of modifications are considered within the purview and scope of the invention as set forth in the following claims.

What is claimed is:

1. Flow indicating means for a device having filter means for trapping and removing particulates from a gaseous medium, said device having a first chamber in which said filter means is provided and a second chamber in communication with the first chamber and provided with motor driven fan means inducing a flow of gaseous medium through the filter means and into the second chamber, said second chamber having an outlet for discharging treated gaseous medium from the device, and the buildup of particulates on said filter means causing a reduction in the permeability of the filter means and gradual increases in the differential pressure drop across said filter means resulting in a gradual reduction in pressure in said second chamber, said flow indicating means comprising, a flow meter disposed within the second chamber of the device, having an inlet and outlet, said inlet being in communication with the same source of gaseous medium entering the first chamber of the device and an outlet in communication with the second chamber of said device, whereby the differential pressure across the inlet and the outlet of the flow meter causes a flow of gaseous medium through said flow meter, said flow meter further having a moveable flow responsive member responsive to changes in the flow velocity of the gaseous medium through the flow meter and displaceable to several discrete positions in the flow meter as a function of the changes in pressure in the second chamber of the device, and indicator means having indicia calibrated in accordance with the differential pressure drop across the flow meter, said indicia being marked off in spaced graduations with the areas between the graduations being shaded in varying amounts and being cooperatively disposed with respect to said flow responsive member to provide a quick visual indication and assessment of the condition of permeability of the filter means in the device.

2. An indicator for indicating varying values of a condition being measured, comprising an indicia scale marked off in uniformally spaced graduations, and shading provided between each pair of graduations, the shading being nonuniform.

3. The indicator of claim 2, wherein the space between each pair of graduations is shaded in varying and different amounts corresponding to the condition being measured.

4. The indicator of claim 2, wherein the spaces between the graduations have progressively more or less of the spaces shaded as a progression is made from one end of the scale to the other end of the scale, depending upon which end of the scale the progression is commenced from.

5. The indicator of claim 2, wherein the scale is two dimensional and the space between each pair of graduations is substantially rectangular.

6. The indicator of claim 2, wherein the indicia scale is vertically disposed, with the uppermost graduation indicating the maximum condition being measured and the lowermost graduation indicating the least value of the condition being measured, and shaded areas between each pair of graduations becoming greater as progression is made from the lowermost graduation to the uppermost graduations.

7. The indicator of claim 6, wherein the dimensions of the graduation longitudinally become progressively less as a progression is made from a lowermost graduation to the upper most graduation.

8. The indicator of claim 7, wherein the ends of the graduations along one side of the scale are in vertical alignment, and the other ends of the scale lie along an imaginary line inclined from the vertical to form a substantially right-angle triangle.

* * * * *

UNITED STATES PATENT AND TRADEMARK OFFICE
CERTIFICATE OF CORRECTION

Page 1 of 2

PATENT NO. : 5,131,932
DATED : July 21, 1992
INVENTOR(S) : Dov Z. Glucksman

It is certified that error appears in the above-indentified patent and that said Letters Patent is hereby corrected as shown below:

In the Drawings, figure 8, should be deleted to appear as per attached figure 8.

Signed and Sealed this

Seventh Day of June, 1994

Attest:

BRUCE LEHMAN

Attesting Officer

Commissioner of Patents and Trademarks